US006684137B2

(12) United States Patent
Takagi et al.

(10) Patent No.: US 6,684,137 B2
(45) Date of Patent: Jan. 27, 2004

(54) TRAFFIC ACCIDENT RECORDING SYSTEM

(75) Inventors: Masahito Takagi, Cambridge, MA (US); Ichiro Masaki, Boxboro, MA (US)

(73) Assignees: Yokogawa Electric Corporation, Tokyo (JP); Massachusetts Institute of Technology, Cambridge, MA (US)

(*) Notice: Subject to any disclaimer, the term of this patent is extended or adjusted under 35 U.S.C. 154(b) by 26 days.

(21) Appl. No.: 10/040,509

(22) Filed: Dec. 29, 2001

(65) Prior Publication Data

US 2003/0125853 A1 Jul. 3, 2003

(51) Int. Cl.[7] ................................................ G01B 17/00

(52) U.S. Cl. ........................... 701/35; 701/28; 340/901; 340/903

(58) Field of Search ............................ 701/35, 28, 300, 701/301; 340/901, 909, 910, 916, 917, 933, 937

(56) References Cited

U.S. PATENT DOCUMENTS

| | | | | | |
|---|---|---|---|---|---|
| 4,398,171 | A | * | 8/1983 | Dahan et al. | 340/901 |
| 5,396,429 | A | * | 3/1995 | Hanchett | 701/117 |
| 6,111,523 | A | * | 8/2000 | Mee | 340/937 |
| 6,246,933 | B1 | * | 6/2001 | Bague | 701/35 |
| 6,275,773 | B1 | * | 8/2001 | Lemelson et al. | 701/301 |
| 6,373,402 | B1 | * | 4/2002 | Mee | 340/937 |
| 6,389,340 | B1 | * | 5/2002 | Rayner | 701/35 |
| 6,405,132 | B1 | * | 6/2002 | Breed et al. | 701/301 |
| 6,487,500 | B2 | * | 11/2002 | Lemelson et al. | 701/301 |
| 6,574,538 | B2 | * | 6/2003 | Sasaki | 701/35 |

FOREIGN PATENT DOCUMENTS

WO WO 01/91059 A1 * 11/2001

* cited by examiner

*Primary Examiner*—William A. Cuchlinski, Jr.
*Assistant Examiner*—Olga Hernandez
(74) *Attorney, Agent, or Firm*—Moonray Kojima

(57) ABSTRACT

A traffic accident recording system, wherein a recording unit is provided along a road, comprising a TV camera for continously obtaining visual images of a certain section of the road and a storage unit for continuously storing the visual images from the TV camera, and an accident recognition unit provided in a vehicle which upon occurrence of an accident transmits a trigger signal to the recording unit so that the storage unit retains visual images of the section of the road whereat the accident occurred at specified time durations before, during and after the occurrence of the accident. Thereafter, the stored visual images can be accessed and stored for later use. Also devices are provided for periodically discarding visual images not used.

13 Claims, 2 Drawing Sheets

TRAFFIC ACCIDENT RECORDING SYSTEM

BACKGROUND OF THE INVENTION

1. Field of Invention

This invention relates to a system for recording traffic accidents, for example, using TV cameras to obtain visual images of vehicle accidents and storing such visual images for immediate and/or later use.

2. Discussion of the Prior Art

The prior art is deficient in recording and storing visual images of vehicle accidents. Suggestions have been made to use a collision sound to start visual recording of an accident, such as using a microphone located besides a road to pick up the collision sound. But, such a suggested approach is not sufficiently accurate to detect traffic accidents since it would depend on the loudness and frequency components of the sound of the collision and would also require a multiplicity of microphones.

A vehicle traffic congestion increases, studies need to be conducted on various aspects of traffic accidents. Unfortunately, visual recordings of actual accidents in real time which can be captured with appropriate exact timing do not exist in large numbers. By observing prior actual accidents, substantial information on causes and remedies can be obtained. However, currently, such studies are hampered by insufficient amount of such stored images of prior vehicle accidents. It would also be helpful to resolution of disputes involving traffic accidents and the like if actual real time visual images of accidents were available.

SUMMARY OF THE INVENTION

Accordingly, an object of the invention is to provide a system for accurately recording and storing visual images of vehicle accidents in real time.

The foregoing and other objects are attained by the invention, wherein an accident recognition unit is disposed on a vehicle so that upon occurrence of an accident, such as involving the vehicle, the unit transmits a trigger signal to recording unit provided along the side of the road on which the vehicle is traveling, which recording unit uses a TV camera to continuously obtain visual images of a selected portion of the road and a storage unit which stores the visual images obtained by the TV camera. The recording unit receives the trigger signal to control the storage unit to store and transmit to a central control the visual images of the selected portion of the road, where the vehicle is involved in an accident, for a selected time before, during and after the accident. The trigger signal can be sent to the central control which then sends a signal to a particular recording unit to commence the same procedure. In this manner, an accurate, real time, visual image of the selected road area before, during and after the accident for a desired time duration of each period, is obtained. In this manner, a plurality of such vehicle accidents and visual images thereof can be stored at a central location for later use, research, study, and, for example, as testimony in a trial where issues involving the accident need to be resolved.

DETAILED DESCRIPTION OF THE PREFERRED EMBODIMENTS

Figure 1:
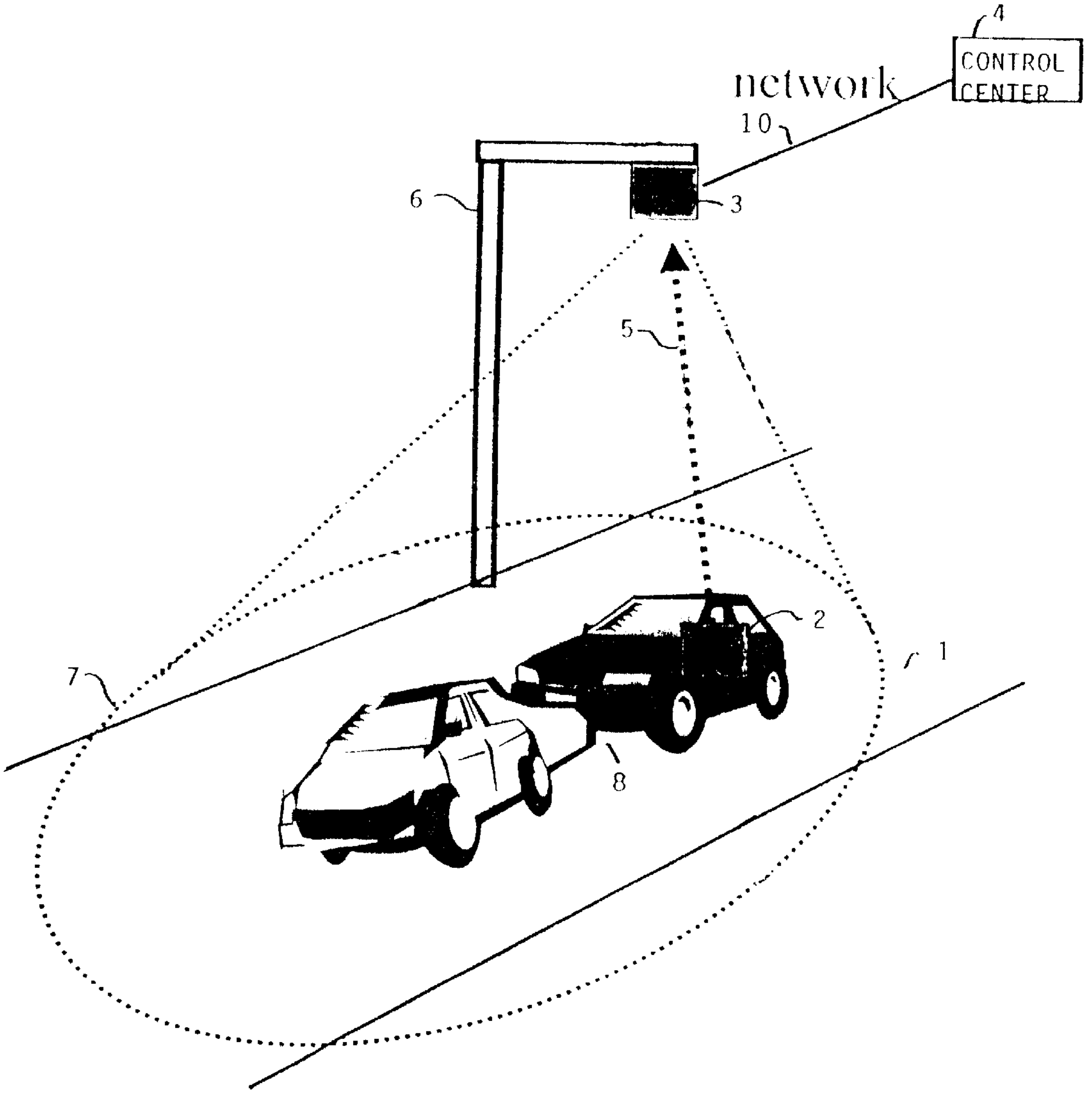
FIG. 1 is a perspective view depicting an illustrative embodiment of the invention encompassing the system.

FIG. 1 shows a road 1, in which a traffic accident 8 has occurred between two vehicles. One vehicle, at least, although both vehicles can have the units, contains a traffic accident recognition unit 2, which supplies a trigger signal 5, to a recording unit 3.

Figure 2:
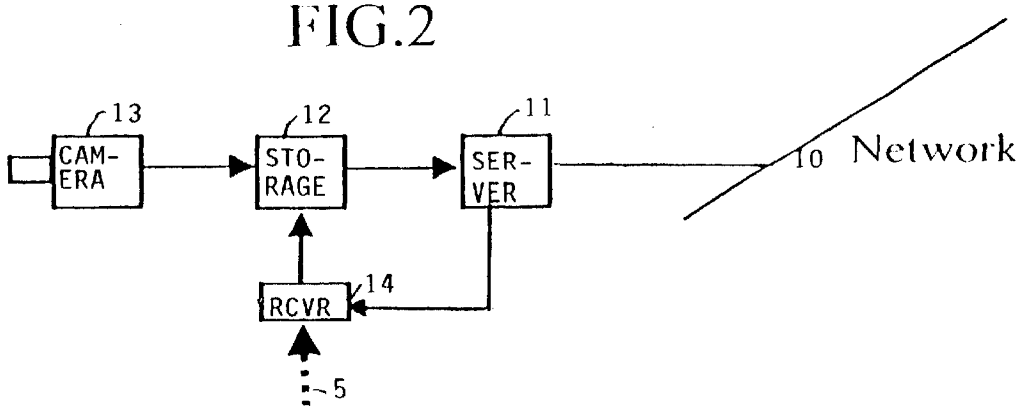
FIG. 2 is a block diagram depicting details of the recording unit.

The recording unit 3, shown in greater detail in FIG. 2, comprises a tV camera 13, which is connected to an image storage unit 12, which is controlled by signal receiver and controller 14 or control center 4, and is connected to a network server 11, and thereto to a network 10, as depicted. Controller 14 is labeled "RCVR" in the drawing for convenience only and is not to be taken as limiting thereof. The server 11 is also connected for sending signals to controller 14.

The network 10 may be wired or wireless, such as accessed by a cellular phone, radio waves, infrared waves, microwaves, etc. The receiver and controller 14 receives directly or through a network the trigger signals 5 from transmitter 25 of accident recognition unit 2 disposed in the vehilce or from a control center 4 sent through a network 10 (see FIG. 1). Also, signals for suitable use are sent from server 11 to controller 14, as depicted by the interconnection.

The TV camera may be a closed circuit TV camera, readily available on the market and known as a CCTV, etc. The camera 13 scans continuously a predetermined image recording area 7 (see FIG. 1) so that an accident occurring in that area 7 will be picket up by the camera 13. It is also possible to periodically scan in a manner that would be sampling of data with result of nearly total coverage, as known in the sampling art. A plurality of recording units 3 are provided so that a desired amount of coerage of a raod is obtained. In some congested areas, for example, one may desire to place a unit each X feet, whereas in rural areas one may desire to place a unit each mile and/or at intersections, etc. The placement of units may depend on the type of research being conducted on occurrence of accidents, causes, and on policy of traffic management, etc.

As shown in FIG. 1, a control center 4 may be used with communication between the control center 4 and the recording unit being through a network 10, which may be wired or wireless. Advantageously, the control center 4 may receive the trigger signal directly from the accident recognition unit 2 disposed in the vehicle, and then through communication through network 10, inform one or more recording units 3 of the accident and control the retaining of visual images prior to, during and after the accident for selected time periods, respectively. Then, through suitable instructions, the recording unit 3 will send the data to the control center 4 for storage or other usage. Also, the trigger signal 5 from the recognition unit 2 can go directly to the recording unit 3 and also the control center 4. Such accident occurrence can be recorded by recording unit 3 and/or by control center 4. Also, control center 4 can be used to obtain various traffic information from the recognition unit 2 and the recording unit 3.

The recording unit 3, as shown in FIG. 1, may be placed on a standard or pole 6 beside a road, or above the road as shown. Although shown as being on a pole 6, the unit 3 may be disposed close to or on the ground.

Figure 3:
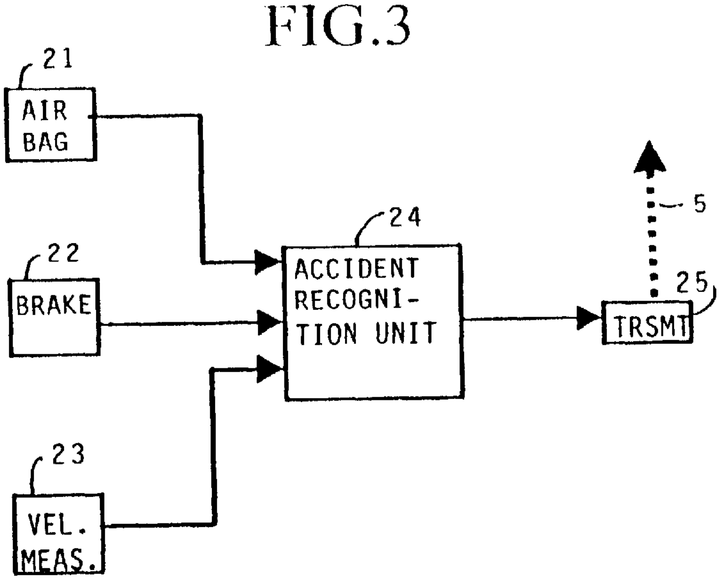
FIG. 3 is a block diagram depicting details of the traffic accident recognition unit.

The accident recognition unit 2 which is placed in a vehicle, as shown in FIG. 3, comprises an accident recognition unit 24, which is connected to a plurality of sensors, such as a sensor which detects air bag ignition (see item 21), or a unit that detects sudden braking (see item 22), or a unit that detects sudden changes in the speed of the vehicle (see item 23), and similar sensors, not shown. For example, when the air bag is ignited, the sensor will send a signal to recognition unit 24, which will then produce a trigger signal. That signal is then supplied to signal transmitter 25, which the transmits the trigger signal 5. Advantageously, the signal transmitter 25 may utilize a variety of different waves, such as radio waves, infrared waves, microwaves, etc. Thus, when the vehicle carrying the accident recognition unit 2 is involved in an accident, such as shown in FIG. 1, with another vehicle (although it need not be in an accident with another vehicle, and can itself be involved in an accident, such as hitting a tree on the side of a road) and the air bag is ignited, the sensor 21 will detect such air bag ignition, and send a signal to accident recognition unit 24, which will then generate a trigger signal which is supplied to signal transmitter 25 for transmission of the trigger signal 5 to control center 4 (see FIG. 1) and/or to signal receiver and controller 14 to control the obtaining of visual images by camera 13 and stored in storage unit 12 before, during and after the accident for specified periods of time.

The controller 14 of recording unit 3 and/or control center 4 and/or recognition unit 3 may each have a clock generator for timing purposes. The time may be placed directly on the visual images, stored images, etc. Also, the clock may be used to conform the obtaining, storing and transmission of the visual images.

The traffic accident recognition unit 2 may comprise a GPS (Global Positioning System) device or means for measuring the location of the vehicle or providing information as to the location of the vehicle. The location data provided by the GPS device may be transmitted with trigger signal 5 t the recording unit 3 and/or the control center 4, for suitable use.

Advantageously, the visual images may be stored in a tape recorder and/or hard disc storage unit. Image storage unit 12 of recording unit 3 may also comprise temporary storage devices. Also, control center 4 may comprise storage units, such as video tape and/or hard disc units, for appropriate storage of visual images and/or other data.

The control center 4 through appropriate instructions may control obtaining and disbursing of various traffic instructions, data and timing thereof. Traffic conditions may also be monitored using the instant system. The control center 4 may also use an appropriate alarm signal to control the various units 2 and 3 when desried, usin, for example, network 10.

The control unit 14 of recording unit 3 comprises means for controlling the periodic discarding of visual images and/or other data stored in storage unit 12 so that the memory capacity of storage unit 12 will always be sufficient to store visual data and images before, during and after an accident. When there is no accident, the controller 14 will cause the discarding of stored visual images and/or other data. This occurs, for example, every 5 minutes, when during the 5 minute point, an accident has not occurred and the trigger signal 5 has not be generated and transmitted to unit 2. In that case, controller 14 will cause storage unit 12 to discard the stored visual data and other data for the period of 5 minutes to 4 minutes prior to that time.

Thus, even if during the discarding process, an accident occurs, the 1 minute prior to the accident will still be available for passing on to the control center 4 together with the visual images and data during and after the accident. The controller 14 uses the clock therein for the timing of the duration for such before, during and after accident of the obtaining visual images, storing same, and read out of same.

It should be noted that the camera 13 may be moved to cover a larger area, if so desired. The control center 4 may also be a roving unit, such as a roving station. The accumulated visual images of a plurality of accidents may be permanently recorded and stored for later use. Study of such past accidents may be helpful in reducing future accidents, improving safety of passengers, reduce property damage, etc. Thus, this invenion will open up an avaenue of study heretofore not generally available. Also, the stored visual images of accidents can form the basis for vital testimony in lawsuits where issues involving vehicular accidents are concerned.

The foregoing description is illustrative only. Numerous modifications and extensions thereof would be apparent to the worker skilled in the art. All such modifications and extensions of the principles of the invention are to be considered to be within the spirit and scope of the invention.

What is claimed is:

1. A traffic recording system comprising:

first means for obtaining visual images of a traffic accident and surrounding areas, said first means being disposed near a road and including a TV camera for obtaining said visual images, storage means for storing said visual images from said TV camera, discarding means for periodically or continuously discarding stored visual images after a selected period of time when no accident has occurred, and signal means for controlling said TV camera and said storage means upon receiving a trigger signal, said storage means further comprising:

second means for continuously storing visual images; and third means for controlling said second means and said discarding means so that upon receipt of said trigger signal, said visual images from said TV camera are stored in said storage means and later accessed, said visual images being for preselected time periods before, during and after an accident involving a vehicle; and fourth means for providing said trigger signal upon occurrence of said accident involving said vehicle, said fourth means being disposed on said vehicle and including a trigger generating means for providing said trigger signal upon occurrence of said accident, and transmitter means for transmitting said trigger signal provided by said trigger generating means.

2. The system of claim 1, wherein said storage means comprises either a video tape recorder or, in the alternative, a hard disc video recorder.

3. The system of claim 1, wherein said transmitter means comprises either means for transmitting radio waves, or, in the alternative, means for transmitting infrared waves.

4. The system of claim 1, wherein said trigger generating means comprises means for detecting one or more of the following: air bag ignition, sudden braking of said vehicle, and sudden stopping of said vehicle due to collision.

5. The system of claim 1, wherein said storage means comprises means for receiving data on traffic conditions and for storing said data on traffic conditions.

6. The system of claim 1, wherein said first means further comprises clock means for recording time of said visual images.

7. The system of claim 1, wherein said first means further comprises vehicle location means for transmitting vehicle location data with said visual images.

8. The system of claim 1, further comprising a network and wherein said fourth means transmits said trigger signal through said network.

9. The system of claim 7, wherein said vehicle location means comprises a global positioning system device.

10. A traffic recording system comprising:

first means for obtaining visual images of a traffic accident and surrounding areas, said first means being disposed near a road and including a TV camera for obtaining said visual images, storage means for storing said visual images from said TV camera, and signal means for controlling said TV camera and said storage means upon receiving a trigger signal;

second means for providing said trigger signal upon occurrence of an accident involving a vehicle, said second means being disposed on said vehicle and including a trigger generating means for providing said trigger signal upon occurrence of said accident, and transmitter means for transmitting said trigger signal provided by said trigger generating means; and a traffic control center for receiving said trigger signal from said second means and for transmitting a signal to said first means to control said TV camera and said storage means, wherein said trigger signal is received through a network and said transmitted signal is transmitted through said network.

11. The system of claim 10, wherein said traffic control center comprises means for transmitting over said network, image data, traffic signal data, and time.

12. The system of claim 10, wherein said network is either wired, or, in the alternative, wireless.

13. The system of claim 10, wherein said traffic control center comrpises means for transmitting an alarm signal over said network when an accident has occurred.

* * * * *